(12) United States Patent
Yamamoto et al.

(10) Patent No.: US 9,592,727 B2
(45) Date of Patent: Mar. 14, 2017

(54) HYBRID VEHICLE

(71) Applicant: TOYOTA JIDOSHA KABUSHIKI KAISHA, Toyota-shi, Aichi-ken (JP)

(72) Inventors: Masaya Yamamoto, Toyota (JP); Toshinori Okochi, Toyota (JP); Keita Imai, Seto (JP); Tomohiko Miyamoto, Toyota (JP); Koichi Okuda, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/928,115

(22) Filed: Oct. 30, 2015

(65) Prior Publication Data

US 2016/0121707 A1 May 5, 2016

(30) Foreign Application Priority Data

Oct. 31, 2014 (JP) .................. 2014-222810

(51) Int. Cl.

| | |
|---|---|
| *B60K 6/22* | (2007.10) |
| *B60K 11/02* | (2006.01) |
| *B60K 17/00* | (2006.01) |
| *B60W 10/06* | (2006.01) |
| *B60W 10/08* | (2006.01) |
| *B60W 10/30* | (2006.01) |

(Continued)

(52) U.S. Cl.
CPC ............... *B60K 6/22* (2013.01); *B60K 6/445* (2013.01); *B60K 11/02* (2013.01); *B60K 17/00* (2013.01); *B60W 10/06* (2013.01); *B60W 10/08* (2013.01); *B60W 10/30* (2013.01); *B60W 20/00* (2013.01); *F16H 57/0413* (2013.01); *F16H 57/0475* (2013.01); *F16H 57/0476* (2013.01); *Y10S 903/93* (2013.01)

(58) Field of Classification Search
CPC ........... B60L 2240/425; B60L 15/2009; B60L 15/2054
See application file for complete search history.

(56) References Cited

U.S. PATENT DOCUMENTS

2009/0107755 A1* 4/2009 Kothari .................. B60K 6/445
                                                              180/339
2014/0234124 A1 8/2014 Rühle et al.

FOREIGN PATENT DOCUMENTS

| JP | 5330349 A | 12/1993 |
|---|---|---|
| JP | 898464 A | 4/1996 |

(Continued)

*Primary Examiner* — John Walters
*Assistant Examiner* — James Triggs
(74) *Attorney, Agent, or Firm* — Sughrue Mion, PLLC

(57) ABSTRACT

A hybrid vehicle includes an engine, a motor configured to output power for traveling, a drive wheel coupled to the engine and the motor, a transmission provided i) between the engine and the motor and ii) between the engine and the drive wheel, the transmission being configured to shift gears in a plurality of stages or continuously, a refrigerant supply device including a pump and a refrigerant pressure regulation device, the refrigerant supply device being configured to supply a refrigerant to the motor, and the refrigerant supply device being configured to supply the refrigerant to the transmission as a hydraulic fluid, and at least one electronic control unit configured to control the refrigerant supply device based on a load situation of the motor by controlling a refrigerant supply pressure to the motor.

9 Claims, 9 Drawing Sheets

(51) Int. Cl.
*B60W 20/00* (2016.01)
*B60K 6/445* (2007.10)
*F16H 57/04* (2010.01)

(56) References Cited

FOREIGN PATENT DOCUMENTS

| | | |
|---|---|---|
| JP | 2013-207929 A | 10/2010 |
| JP | 2013-006433 A | 1/2013 |
| JP | 2013-67223 A | 4/2013 |

* cited by examiner

HYBRID VEHICLE

INCORPORATION BY REFERENCE

The disclosure of Japanese Patent Application No. 2014-222810 filed on Oct. 31, 2014 including the specification, drawings and abstract is incorporated herein by reference in its entirety.

BACKGROUND OF THE INVENTION

1. Field of the Invention

The invention relates to a hybrid vehicle which includes an engine and a motor as a power source.

2. Description of Related Art

In the related art, a hybrid vehicle which includes an engine and a motor as a power source is known. In such a hybrid vehicle, a traveling mode is selectable among a mode in which the vehicle travels only with engine power, a mode in which the vehicle travels with power of both of the engine and the motor, and a mode in which the vehicle travels only with the motor, according to a vehicle state or a driver's operation.

In the hybrid vehicle described above, for example, lubricating oil, such as an automatic transmission fluid (ATF), is supplied to the motor as a refrigerant to cool the motor which generates heat by rotational drive. A clutch may be disposed between the engine and the motor, and lubricating oil described above may be used as a hydraulic fluid for engaging or disengaging the clutch.

For example, Japanese Patent Application Publication No. 2013-207929 (JP 2013-207929 A) discloses a hybrid vehicle including pressure control means for regulating a line pressure of oil fed with pressure from a mechanical pump driven by engine output or an electric pump driven by a dedicated drive motor. In this hybrid vehicle, oil with the line pressure regulated by the pressure control means is supplied to a motor for traveling as a refrigerant, and is supplied as hydraulic oil for engaging or disengaging a clutch disposed between the engine and the motor.

SUMMARY OF THE INVENTION

In the hybrid vehicle described above, at the time of traveling at a high speed using motor output, the motor output becomes great and the motor temperature increases; therefore, it is necessary to improve cooling performance.

On the other hand, in the related art, in a vehicle including an automatic transmission other than a hybrid vehicle, when the automatic transmission is shifted using an ATF supplied by a pump, the line pressure of the ATF is regulated according to the shift operation of the automatic transmission. However, the ATF amount which can be supplied with a predetermined line pressure reaches the limit from certain pump output and is not increased; therefore, when ATF supply means is applied to the hybrid vehicle and the ATF is supplied to a motor as a refrigerant to cool the motor, an appropriate amount of a refrigerant necessary for cooling the motor may not be secured.

The invention provides a hybrid vehicle which uses a hydraulic fluid of a transmission as a refrigerant of a motor, having an advantage of appropriately increasing a refrigerant supply amount when a motor cooling request is great.

A hybrid vehicle according to an aspect of the invention includes an engine, a motor configured to output power for traveling, a drive wheel coupled to the engine and the motor, a transmission provided i) between the engine and the motor and ii) between the engine and the drive wheel, the transmission being configured to shift gears in a plurality of stages or continuously, a refrigerant supply device including a pump and a refrigerant pressure regulation device, the refrigerant supply device being configured to supply a refrigerant to the motor, and the refrigerant supply device being configured to supply the refrigerant to the transmission as a hydraulic fluid, and at least one electronic control unit configured to control the refrigerant supply device based on a load situation of the motor by controlling a refrigerant supply pressure to the motor. Here, the load situation of the motor may include at least one of a vehicle speed, a motor temperature, a refrigerant temperature, and motor output.

In the aspect of the invention, the electronic control unit may be configured to increase the refrigerant supply pressure to the motor by the refrigerant pressure regulation device when at least one of conditions i), ii), iii) and iv) is satisfied, i) a vehicle speed is equal to or higher than a predetermined speed, ii) the temperature of the motor is equal to or higher than a predetermined motor temperature, iii) the refrigerant temperature is equal to or higher than a predetermined refrigerant temperature, and iv) the motor output is equal to or greater than a predetermined motor output value.

In the aspect of the invention, the refrigerant supply device may include a refrigerant circulation supply passage which circulates the refrigerant and supplies the refrigerant to the motor, and a refrigerant cooling part provided in the refrigerant circulation supply passage.

In the aspect of the invention, the electronic control unit may be configured to a) control the refrigerant supply device such that the refrigerant supply pressure becomes a first pressure when at least one of conditions i), ii), iii) and iv) is satisfied, i) a vehicle speed is equal to or higher than a predetermined speed, ii) the temperature of the motor is equal to or higher than a predetermined motor temperature, iii) the refrigerant temperature is equal to or higher than a predetermined refrigerant temperature, and iv) the motor output is greater than a predetermined motor output value, and when the output of the pump is less than a predetermined pump output value, and b) control the refrigerant supply device such that the refrigerant supply pressure becomes a second pressure greater than the first pressure when at least one of conditions i), ii), iii) and iv) is satisfied, i) the vehicle speed is equal to or higher than the predetermined speed, ii) the temperature of the motor is equal to or higher than the predetermined motor temperature, iii) the refrigerant temperature is equal to or higher than the predetermined refrigerant temperature, and iv) the motor output is equal to or greater than the predetermined motor output value, and when the output of the pump is equal to or greater than the predetermined pump output value.

In the aspect of the invention, the pump may be a mechanical pump which is driven by at least a part of the output of the engine, the motor may include a first motor generator and a second motor generator, the engine, the first motor generator, and the second motor generator may be connected such that power is transmitted through a planetary gear mechanism, the transmission may be provided between the planetary gear mechanism and the drive wheel, and the electronic control unit may be configured to change the rotation speed of the engine such that the rotation speed of the drive wheel is kept constant when the refrigerant supply pressure to the motor is changed by the refrigerant pressure regulation device.

In this case, the electronic control unit may be configured to, when at least one of conditions i), ii), iii) and iv) is satisfied, i) a vehicle speed is equal to or higher than a predetermined speed, ii) the temperature of the motor is equal to or higher than a predetermined motor temperature, iii) the refrigerant temperature is equal to or higher than a predetermined refrigerant temperature, and iv) the motor output is equal to or greater than a predetermined motor output value, and when the output of the pump is less than the predetermined pump output value, a) control the engine and the motor in a power circulation mode, the power circulation mode being a mode in which the transmission performs shift-down, the second motor generator rotates positively to perform regenerative power generation, and the first motor generator is rotationally driven with negative rotation by the generated regenerative power, and b) increase the rotation speed of the engine after the engine and the motor are controlled in the power circulation mode such that the first motor generator rotates positively and the output of the pump becomes equal to or greater than the predetermined pump output value.

According to the hybrid vehicle according to the aspect of the invention, the control device controls the refrigerant supply operation to the motor by the refrigerant supply device supplying the refrigerant of the motor as the hydraulic fluid of the transmission according to the load situation of the motor; therefore, it is possible to secure an appropriate refrigerant supply amount corresponding to the motor temperature.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described in detail referring to the accompanying drawings. In the description, specific shapes, materials, numerical values, directions, and the like are merely exemplary for facilitating understanding of the invention, and may be suitably changed according to usage, objective, specification, and the like. In addition, a plurality of embodiments, modification examples, and the like are included in the following description, it is convinced that characteristic portions of the embodiments and modification examples may be used in a suitable combination.

Figure 9:
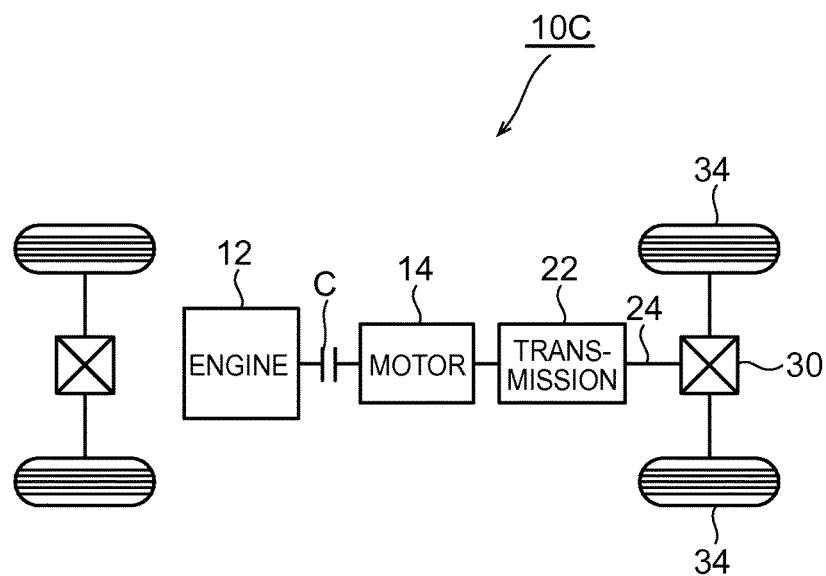
FIG. 9 is a diagram showing a modification example of a hybrid vehicle including an engine and one motor generator.
Figure 10:
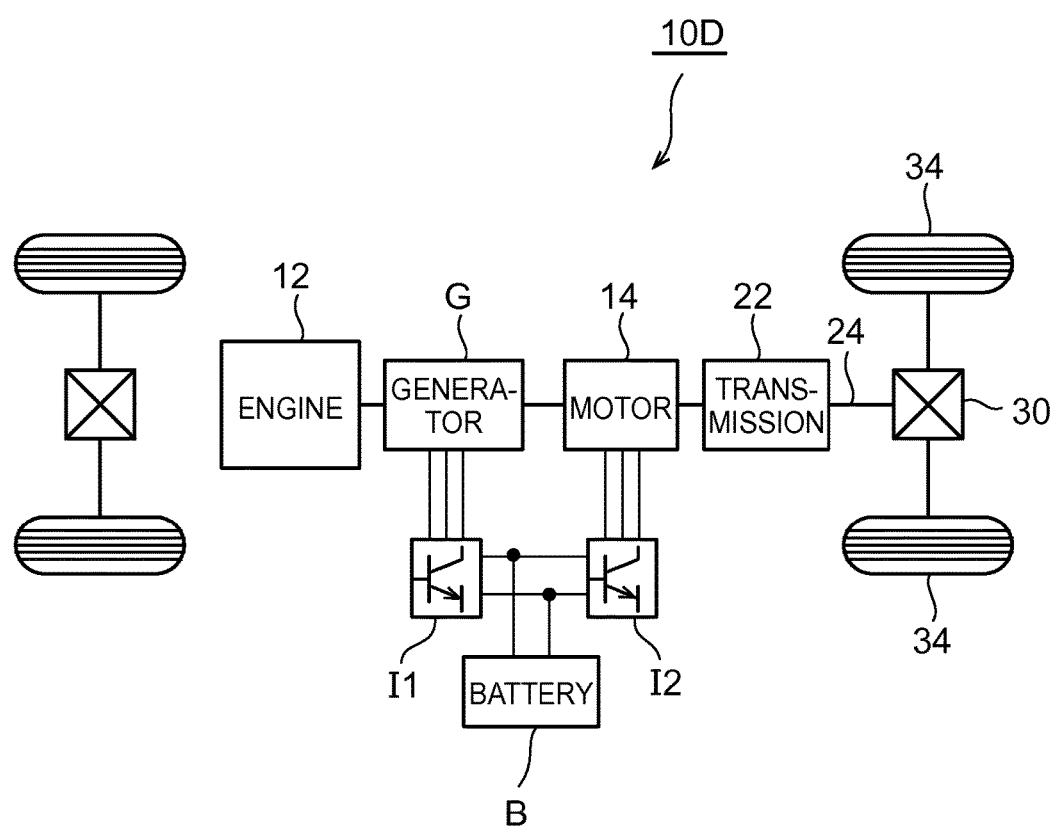
FIG. 10 is a diagram showing another modification example of a hybrid vehicle including an engine, a generator, and one motor generator.

Hereinafter, although a hybrid vehicle in which an engine and two motor generators are mounted will be described as an example, the invention may be applied to a hybrid vehicle 10C in which, as shown in FIG. 9, an engine 12 and one motor 14 are mounted as a power source for traveling. In this case, instead of a planetary gear mechanism described below, a clutch C may be provided as a component for engaging or disengaging the engine 12 and the motor 14. The invention may be applied to a series hybrid vehicle 10D which, as shown in FIG. 10, drives a generator G with the engine 12 to generate electric power, and supplies the generated electric power to one motor 14 through power conversion devices I1, I2 to drive the motor 14, thereby outputting power for traveling.

Figure 1:
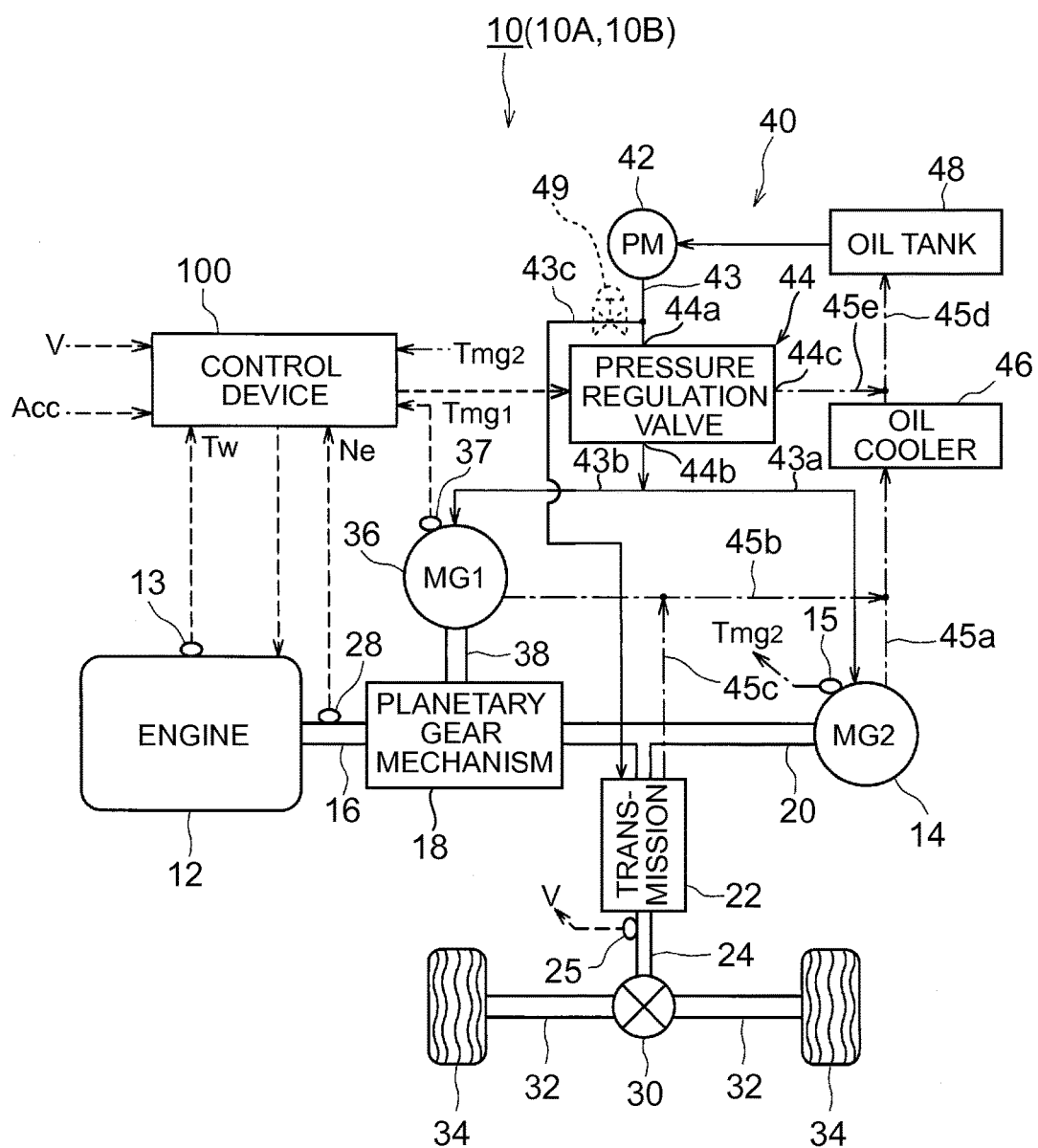
FIG. 1 is a diagram showing the schematic configuration of a hybrid vehicle according to first to third embodiments of the invention.

FIG. 1 is a diagram showing the schematic configuration of a hybrid vehicle 10 of a first embodiment. In FIG. 1, a power transmission system is shown by a round rod-like shaft element, a signal system is shown by a broken line, and a cooling system is shown by a solid line and a one-dot-chain line.

As shown in FIG. 1, the hybrid vehicle 10 includes an engine 12 and a motor generator (MG2) 14 as a power source for traveling. The engine 12 is an internal combustion engine which uses gasoline, light oil, or the like as fuel. An output shaft 16 of the engine 12 is connected to a carrier gear of a planetary gear mechanism 18.

For the motor generator 14, for example, a three-phase synchronous AC motor is preferably used. A rotation shaft 20 extending from a rotor of the motor generator 14 is connected to a ring gear of the planetary gear mechanism 18. The rotation shaft 20 of the motor generator 14 and the ring gear of the planetary gear mechanism 18 are connected to a transmission 22. An output shaft 24 extending from the transmission 22 is coupled to right and left drive wheels 34 through a differential gear 30 and a drive shaft 32.

The transmission 22 has a function of shifting rotation input from at least one of the engine 12 and the motor generator 14 in plural stages and outputting the rotation to the drive wheel 34. The transmission 22 can perform a gear shift operation according to a command from a control device 100 described below. For a gear shift mechanism used in the transmission 22, any gear shift mechanism having a known configuration may be used, or a continuously variable transmission which continuously shifts gears smoothly instead of shifting gears in plural stages may be used.

In the hybrid vehicle 10 having the above configuration, power of the engine 12 is input to the transmission 22 through the planetary gear mechanism 18, and power of the motor generator 14 is input directly to the transmission 22.

The transmission 22 shifts power and outputs power to the output shaft 24. As a result, the drive wheel 34 is rotationally driven through the differential gear 30 and the drive shaft 32, and the hybrid vehicle 10 is allowed to travel.

The hybrid vehicle 10 of this embodiment includes another motor generator (MG1) 36. A rotation shaft 38 extending from a rotor of the motor generator 36 is connected to a sun gear of the planetary gear mechanism 18. Similarly to the motor generator 14 described above, the motor generator 36 can be constituted of a three-phase synchronous AC motor.

The motor generators 14, 36 are driven so as to output power for traveling when electric power supplied from an in-vehicle battery (not shown) is converted to AC power by an electric power converter, such as an inverter, and applied. The motor generators 14, 36 may function as a generator. At the time of regenerative braking of the hybrid vehicle 10, power is input from the drive wheel 34 to the rotation shafts 20, 38 through the transmission 22 or the like, whereby electric power can be generated. The generated electric power can be charged into the battery or can be used as drive power of the other motor generator 14 or 36. The motor generator 36 is rotationally driven and electric power is input to the engine 12 through the planetary gear mechanism 18, whereby cranking at the time of starting of the engine 12 can be performed.

The hybrid vehicle 10 further includes a control device 100. The control device 100 has a function of integrally controlling the operations of the engine 12 and two motor generators 14, 36. The control device 100 has a function of controlling a refrigerant supply operation by a refrigerant supply device described below. The control device 100 is preferably constituted of a microcomputer having a central processing unit (CPU) which executes various control programs, a read only memory (ROM) which stores a control program and a map for control in advance, a random access memory (RAM) which temporarily stores the control program read from the ROM and a detection value detected by each sensor, and the like.

A temperature Tw of engine cooling water which is detected by a temperature sensor 13 attached to the engine 12, an engine speed Ne which is detected by a rotation speed sensor 28 disposed near the output shaft 16 of the engine 12, and motor temperature Tmg1, Tmg2 which are detected by temperature sensors 15, 37 respectively provided in the motor generators 14, 36, and the like are input to an input port of the control device 100.

A vehicle speed V which is detected by a vehicle speed sensor 25 disposed near the output shaft 24 of the transmission 22, and an accelerator opening signal Acc which is input from an accelerator opening sensor (not shown) are input to the input port of the control device 100.

On the other hand, signals for controlling the start, the fuel injection amount, the ignition timing, and the like of the engine 12 are output from an output port of the control device 100 to the engine 12. Signals for controlling the operation of rotational drive or regenerative electric power generation of the motor generators 14, 36 are output from the output port of the control device 100 to a power conversion device, such as an inverter. In addition, a gear shift signal to the transmission 22 is output from the output port of the control device 100 based on the vehicle speed V and the like. A control signal of a pressure regulation valve of a refrigerant supply device described below is output from the output port of the control device 100.

The hybrid vehicle 10 further includes a refrigerant supply device (refrigerant supply means) 40. The refrigerant supply device 40 has a function of supplying a refrigerant so as to cool the motor generators 14, 36, and supplying a refrigerant as a hydraulic fluid of the transmission 22. As the refrigerant, for example, an automatic transmission fluid (ATF) can be preferably used. Hereinafter, the refrigerant is suitably referred to as cooling oil.

The refrigerant supply device 40 includes an oil pump 42, a pressure regulation valve 44, an oil cooler 46, and an oil tank 48. In this embodiment, as the oil pump 42, a mechanical pump which is driven upon receiving at least a part of power of the engine 12 is used. The oil pump 42 and the pressure regulation valve 44 correspond to a pump and refrigerant pressure regulation means in the invention.

The oil pump 42 has a function of feeding cooling oil stored in the oil tank 48. A refrigerant supply passage 43 is connected to the oil pump 42. The pressure regulation valve 44 is provided in the refrigerant supply passage 43. The refrigerant supply passage 43 is branched into first and second refrigerant supply passages 43a, 43b on the downstream side of the pressure regulation valve 44 and respectively connected to the motor generators 14, 36.

Here, the pressure regulation valve 44 has a function of supplying cooling oil to the motor generators 14, 36 in a state where the supply pressure of cooling oil fed from the oil pump 42 is regulated. As a specific example, the pressure regulation valve 44 can be constituted of a tubular valve housing, and a spool valve element stored so as to be movable inside the housing. The spool valve element is movable from a first position to a second position inside the housing by, for example, drive means, such as a solenoid, and is returned from the second position to the first position by return means, such as a spring. The spool valve element of the pressure regulation valve 44 moves from the first position to the second position when the drive means is driven by a control signal from the control device 100, and is returned from the second position to the first position by the return means if the control signal is off.

As shown in FIG. 1, the housing of the pressure regulation valve 44 has at least an input port 44a, an output port 44b, and an excess port 44c. As described above, if the spool valve element is driven from the first position to the second position, the degree of opening of the excess port 44c decreases, and the ratio of communication of the input port 44a and the output port 44b increases. As a result, it is possible to increase the refrigerant supply pressure to the motor generators 14, 36. Conversely, if the spool valve element in the pressure regulation valve 44 is returned from the second position to the first position, the degree of opening of the excess port 44c increases, and the ratio of communication of the input port 44a and the output port 44b decreases, whereby the refrigerant supply pressure to the motor generators 14, 36 can be reduced.

Figure 2:
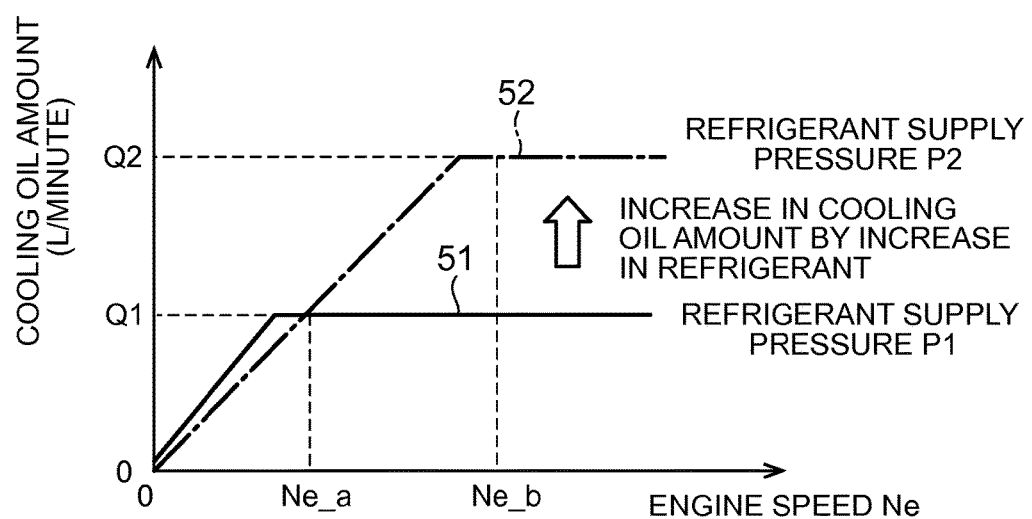
FIG. 2 is a graph showing the characteristic of a refrigerant supply device in FIG. 1.

FIG. 2 is a graph showing the characteristic of the refrigerant supply device 40 in this embodiment. In the graph, the horizontal axis represents the engine speed Ne, and the vertical axis represents the amount of cooling oil supplied to the motor generators 14, 36. The oil pump 42 of this embodiment is a mechanical pump which is driven with power of the engine 12, and the engine speed Ne on the horizontal axis can be identified as pump output.

When the spool valve element in the pressure regulation valve 44 is at the first position, the refrigerant supply pressure to the motor generators 14, 36 is set to be low. In this state, the amount of cooling oil increases in proportion to a rise of the engine speed Ne from zero; however, if the engine speed Ne is equal to or higher than a certain engine speed, a cooling oil amount Q1 and a refrigerant supply pressure P1 reach the limit and do not increase. This is because the amount of oil returned from the excess port 44c of the pressure regulation valve 44 to the oil tank 48 only increases at a higher engine speed.

In contrast, if the spool valve element in the pressure regulation valve 44 is driven to the second position, as indicated by a one-dot-chain line 52 in FIG. 2, the amount of cooling oil can be increased to a cooling oil amount Q2 (>Q1) and a refrigerant supply pressure P2 (>P1) in proportion to the engine speed Ne. Here, the cooling oil amount Q2 is a maximum amount of oil which can be supplied to the motor generators 14, 36 with the refrigerant supply pressure P2, and is, for example, about 1.5 to 2 times the maximum oil amount Q1 with the refrigerant supply pressure P1. However, even in this case, when the engine speed Ne is within a range of zero to Ne_a, a rising inclination is sharper with the refrigerant supply pressure P1, and the amount of cooling oil increases. Accordingly, the refrigerant supply pressure is set to P1 until the engine speed Ne_a, a greater amount of cooling oil for the motor generators 14, 36 can be secured as the refrigerant of the motor generators 14, 36.

Referring to FIG. 1 again, the refrigerant supply passage 43 extending from the oil pump 42 is branched as a third refrigerant supply passage 43c on the upstream side of the pressure regulation valve 44. The third refrigerant supply passage 43c is connected to the transmission 22. With this, cooling oil fed from the oil pump 42 is supplied as hydraulic oil when executing the gear shift operation in the transmission 22.

For example, an electromagnetic pressure regulation valve 49 may be provided in the third refrigerant supply passage 43c, and the opening may be regulated according to the state (for example, the vehicle speed and the like) of the hybrid vehicle 10 to change or regulate the cooling oil supply pressure to the transmission 22.

A first refrigerant recovery passage 45a is connected to the bottom of a case (not shown) which stores the motor generator 14, and a second refrigerant recovery passage 45b is connected to the bottom of a case (not shown) which stores the motor generator 36. In this embodiment, a third refrigerant recovery passage 45c extending from the transmission 22 joins the second refrigerant recovery passage 45b. The first and second refrigerant recovery passages 45a, 45b join each other and are then connected to the oil cooler 46.

The oil cooler 46 has a function of promoting heat dissipation from cooling oil to reduce the oil temperature. It is preferable that the oil cooler 46 is provided adjacent to, for example, a radiator mounted in the hybrid vehicle 10. The oil cooler 46 is a more preferable component for increasing cooling efficiency by cooling oil; however, the coil cooler 46 is not an essential component in the hybrid vehicle of the invention and may not be provided.

Cooling oil which is cooled to a low temperature when passing through the oil cooler 46 is returned to the oil tank 48 through a fourth refrigerant recovery passage 45d. A fifth refrigerant recovery passage 45e extending from the excess port 44c of the pressure regulation valve 44 joins the fourth refrigerant recovery passage 45d. With this, excess cooling oil by the pressure regulation action in the pressure regulation valve 44 is returned to the oil tank 48 through the fifth and fourth refrigerant recovery passages 45e, 45d. In this way, cooling oil is circulated and supplied to the motor generators 14, 36 and the transmission 22 through the oil pump 42 and the like. The first to fifth refrigerant recovery passages 45a to 45e correspond to a refrigerant circulation supply passage in the invention.

In the above description, although a case where the first and second refrigerant recovery passages 45a, 45b are provided corresponding to the motor generators 14, 36 has been described, the invention is not limited thereto. For example, when the two motor generators 14, 36 are stored in one case, cooling oil may be recovered through one refrigerant recovery passage which is connected to the bottom of the motor case.

Figure 3:
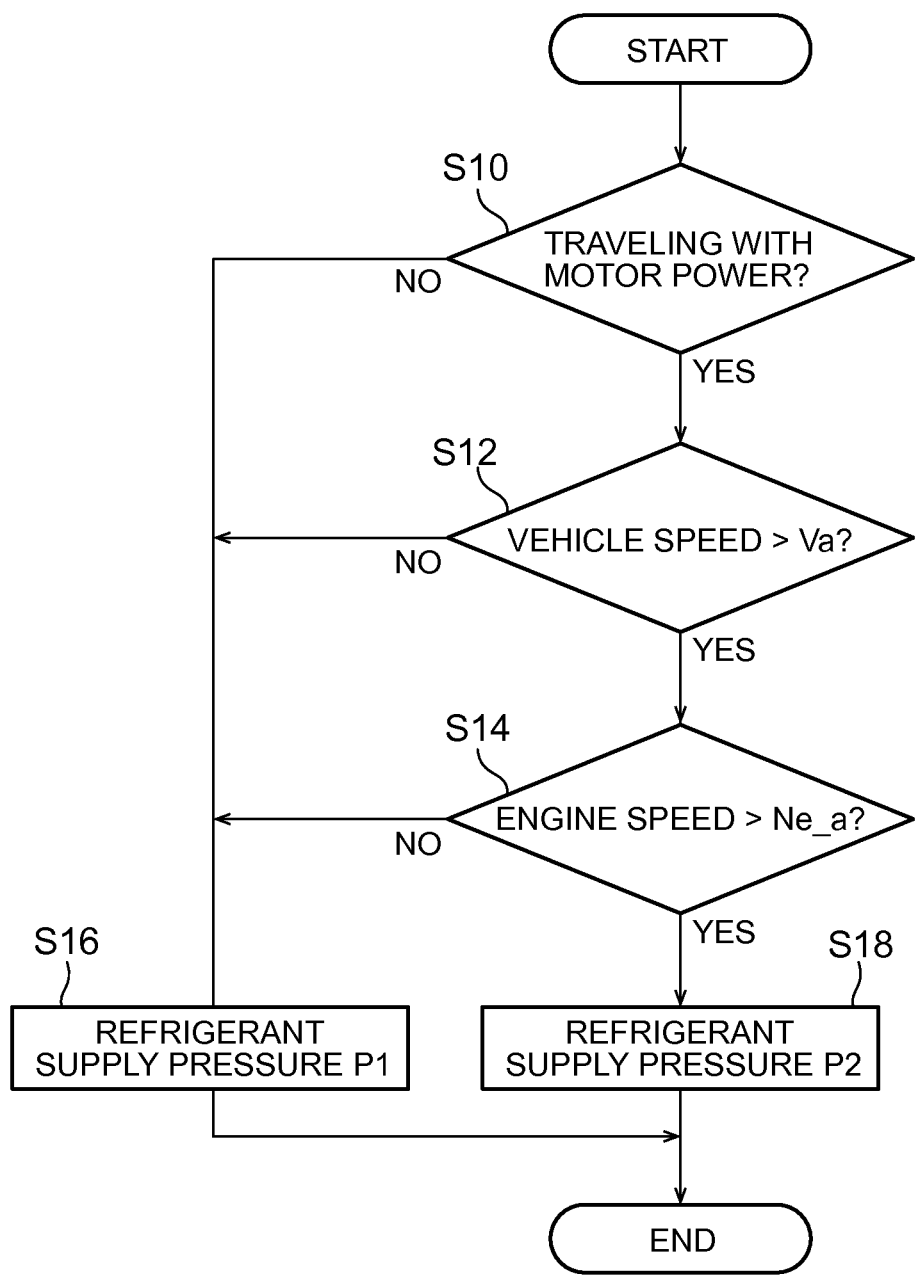
FIG. 3 is a flowchart showing a processing procedure of refrigerant supply operation control which is executed in a control device of the hybrid vehicle of the first embodiment.
Figure 4:
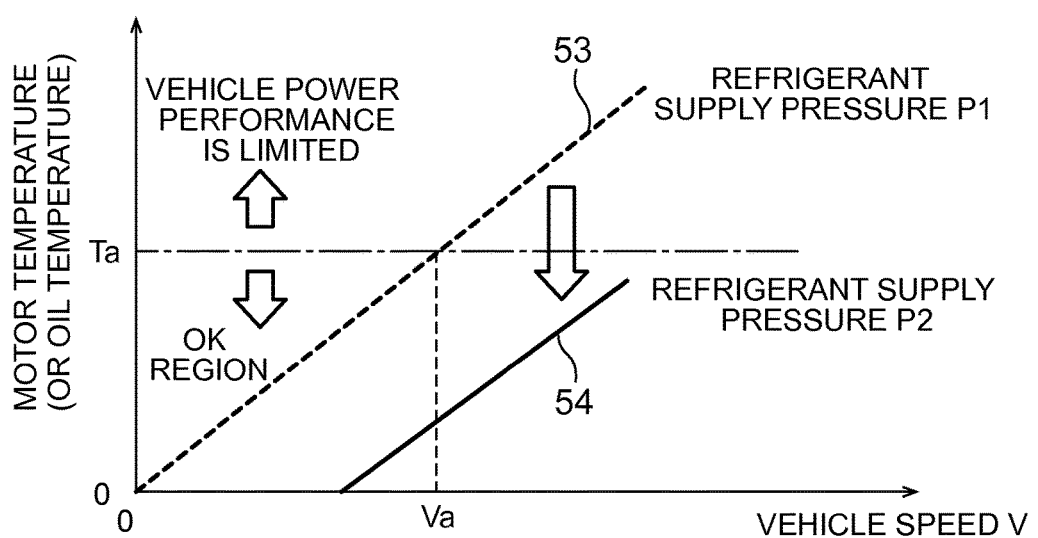
FIG. 4 is a diagram illustrating the action of the refrigerant supply operation control of FIG. 3.

Subsequently, control of the refrigerant supply pressure in the hybrid vehicle 10 having the above configuration will be described referring to FIGS. 3 and 4. FIG. 3 is a flowchart showing a processing procedure of refrigerant supply operation control which is performed in the control device 100 of the hybrid vehicle 10 of this embodiment. This processing is executed at each control cycle in the control device 100. FIG. 4 is a diagram illustrating the action of the refrigerant supply operation control. FIG. 4 shows a graph in which the horizontal axis represents a vehicle speed and the vertical axis represents a motor temperature, and the vehicle speed is Va when the motor temperature becomes a predetermined temperature Ta.

As shown in FIG. 3, first, in Step S10, the control device 100 determines whether or not the hybrid vehicle 10 travels with power of the motor generators 14, 36. In this embodiment, since the motor generator 14 out of the two motor generators 14, 36 is primarily used as a power source for traveling, the determination may be performed based on the drive state of the motor generator 14. A traveling mode in Step S10 includes a traveling state where the output of the engine 12 is assisted by the output of the motor generator 14.

If it is determined to be negative in Step S10 described above, in the next Step S16, the refrigerant supply pressure is set to P1. That is, the spool valve element of the pressure regulation valve 44 is at the first position. On the other hand, if it is determined to be affirmative in Step S10, in the next Step S12, it is determined whether or not the vehicle speed V is higher than a predetermined vehicle speed Va. Here, as shown in FIG. 4, the predetermined vehicle speed Va to be a reference for determination is one of information indicating the load situations of the motor generators 14, 36, and can be set to a vehicle speed at which the temperature of the motor generator 14 becomes equal to or higher than a predetermined temperature Ta in a state where the refrigerant supply pressure for the motor generators 14, 36 is set to be low (that is, to P1). For the predetermined vehicle speed Va, a value which is determined from a test on an actual device, a simulation, or the like and stored in advance can be used.

In the above description, although an example where the vehicle speed is used as information indicating the load situation of the motor generator has been described, the invention is not limited thereto. For example, as information indicating the load situation of the motor generator, the temperature Tmg1, Tmg2 of the motor generators 14, 36 detected by the temperature sensors 15, 37 may be used, the temperature of cooling oil detected by a temperature sensor (not shown) may be used, or a combination thereof may be used.

Referring to FIG. 3 again, if it is determined to be negative in Step S12 described above, in the next Step S16, the refrigerant supply pressure is set to P1. That is, the spool valve element of the pressure regulation valve 44 is at the first position. On the other hand, if it is determined to be affirmative in Step S12, in the next Step S14, it is determined whether or not the engine speed Ne is greater than the predetermined value Ne_a. If it is determined to be negative in Step S14, in the next Step S16, the refrigerant supply pressure is set to P1. In contrast, if it is determined to be affirmative in Step S14, in the next Step S18, the control device 100 transmits a control signal to the pressure regulation valve 44 and moves the spool valve element of the pressure regulation valve 44 from the first position to the second position. With this, the refrigerant supply pressure is set to P2, and as a result, the supply amount of cooling oil for the motor generators 14, 36 increases, making it possible to secure sufficient cooling performance.

Here, referring to FIG. 4, if the temperature of the motor generators 14, 36 is equal to or higher than Ta, it is considered that power performance of the vehicle is limited by reducing the output or torque of the motor generator 14 which outputs power for traveling, or the like, thereby suppressing a further rise in temperature of the motor generator. However, when this happens, drivability of the hybrid vehicle is deteriorated.

In contrast, in the hybrid vehicle 10 of this embodiment, control for increasing the upper limit value of the refrigerant supply pressure for the motor generators 14, 36 from P1 to P2 is executed by the pressure regulation valve 44. With this, when the engine speed Ne becomes a rotation speed (for example, Ne_b in FIG. 2) at which the maximum oil amount Q2 can be supplied, cooling performance for the motor generators 14, 36 increases with an increase in the cooling oil amount, whereby it is possible to reduce the motor temperature from a dotted line 53 in FIG. 4 to a solid line 54. As a result, the motor temperature becomes equal to or lower than the predetermined temperature Ta, and vehicle power performance does not need to be limited; therefore, drivability of the vehicle is not deteriorated.

As described above, according to the hybrid vehicle 10 of this embodiment, the control device 100 controls, based on the vehicle speed V as information indicating the load situation of the motor generator, the refrigerant supply pressure to the motor generators 14, 36 by the refrigerant supply device 40 which supplies, as the hydraulic fluid of the transmission 22, cooling oil as the refrigerant of the motor generators 14, 36. With this, it is possible to secure an appropriate cooling oil amount according to the motor temperature, and to avoid power performance limitation due to overheating of the motor generators 14, 36. Therefore, drivability of the vehicle is not deteriorated.

Next, a hybrid vehicle 10A of a second embodiment will be described referring to FIGS. 5 and 6, in addition to FIG. 1. The hybrid vehicle 10A of this embodiment has the same hardware configuration as the hybrid vehicle 10 of the first embodiment described above referring to the FIG. 1. Accordingly, a difference will be primarily described, and overlapping description will be omitted here.

Figure 5:
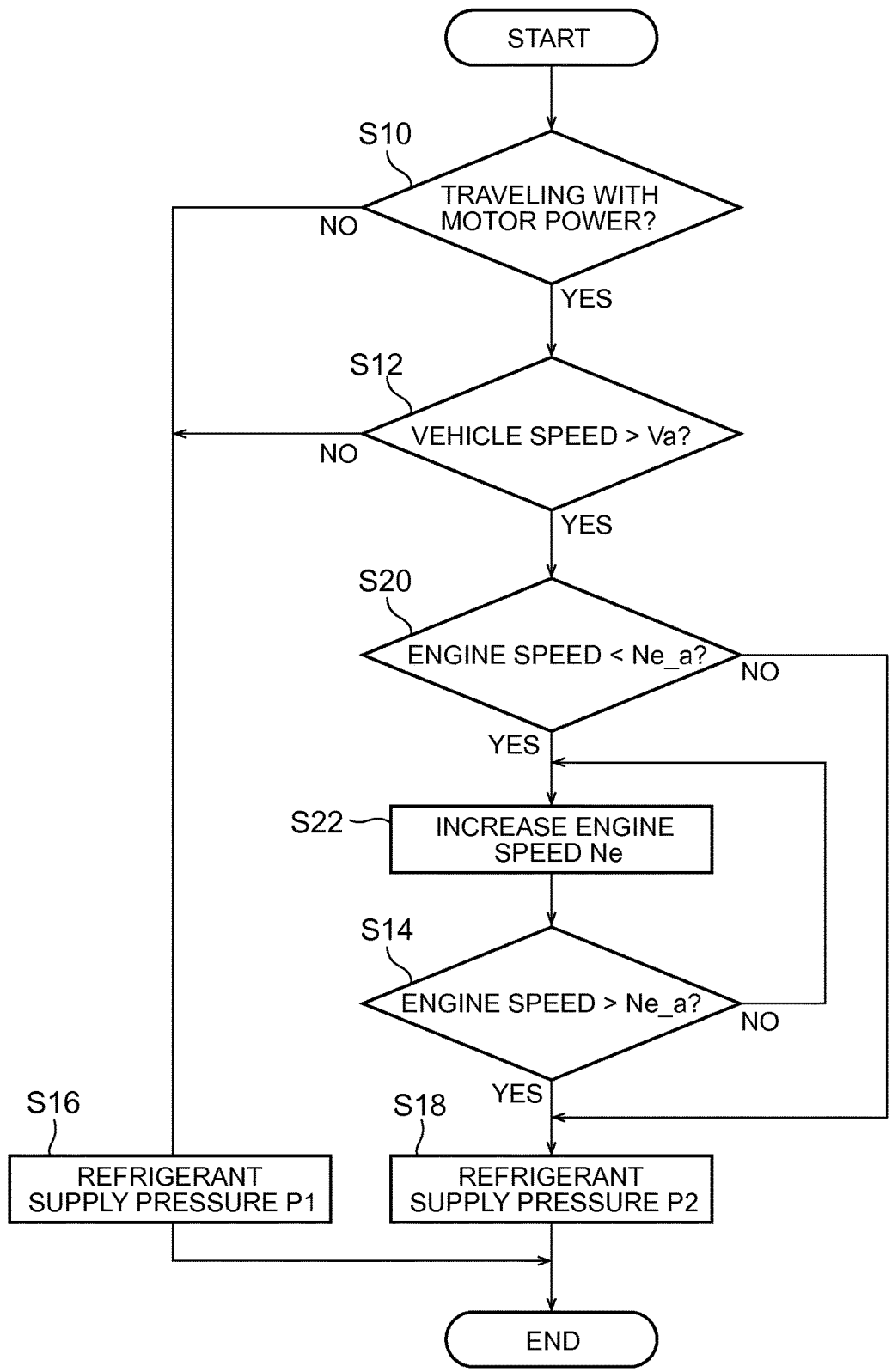
FIG. 5 is a flowchart showing a processing procedure of refrigerant supply operation control which is executed in a control device of the hybrid vehicle of the second embodiment.

FIG. 5 is a flowchart showing a processing procedure of another refrigerant supply operation control which is executed in the control device 100. In FIG. 5, Steps S10, S12, S14, S16, and S18 are the same as the processing procedure shown in FIG. 3. FIG. 6 is a diagram showing changes in the rotation speed of the engine 12 and the motor generators 14, 36 in this embodiment.

Referring to FIG. 5, first, in Step S10, the control device 100 determines whether or not the hybrid vehicle 10A travels using power of the motor generator 14, and when it is determined to be affirmative, in the next Step S12, the control device 100 determines whether or not the vehicle speed V is greater than the predetermined value Va. On the other hand, if it is determined to be negative in one of Steps S10 and S12 described above, in the next Step S16, the refrigerant supply pressure is set to P1. The processing described above is the same as in the first embodiment.

On the other hand, if it is determined to be affirmative in Step S12, in the next Step S20, it is determined whether or not the engine speed Ne is smaller than the predetermined value Ne_a. Here, as described above referring to FIG. 2, the predetermined value Ne_a is an engine speed which becomes a threshold value capable of increasing the cooling oil amount for the motor generators 14, 36 when control for moving the spool valve element of the pressure regulation valve 44 to the second position to increase the refrigerant supply pressure from P1 to P2 is performed.

If it is determined to be negative in Step S20 described above (that is, the engine speed Ne≥Ne_a), in the next Step S18, processing for increasing the refrigerant supply pressure to P2 is executed. This processing is the same as in the first embodiment described above.

On the other hand, if it is determined to be affirmative in Step S20 described above (that is, the engine speed Ne<Ne_a), in the next Step S22, processing for increasing the engine speed Ne is executed, and in the next Step S14, it is determined whether or not the engine speed Ne is greater than the predetermined value Ne_a. The processing for increasing the engine speed in Step S22 described above is repeatedly executed until it is determined to be affirmative in Step S14.

If it is determined to be affirmative in Step S14 (that is, the engine speed Ne>Ne_a), in the next Step S18, processing for setting the refrigerant supply pressure described above to P2 is executed.

In this way, according to the hybrid vehicle 10A of this embodiment, the control for increasing the refrigerant supply pressure is performed after increasing the engine speed Ne to be equal to or greater than the predetermined value Ne_a; therefore, it is possible to appropriately increase the cooling oil amount necessary for cooling the motor after sufficiently securing pump output.

Figure 6:
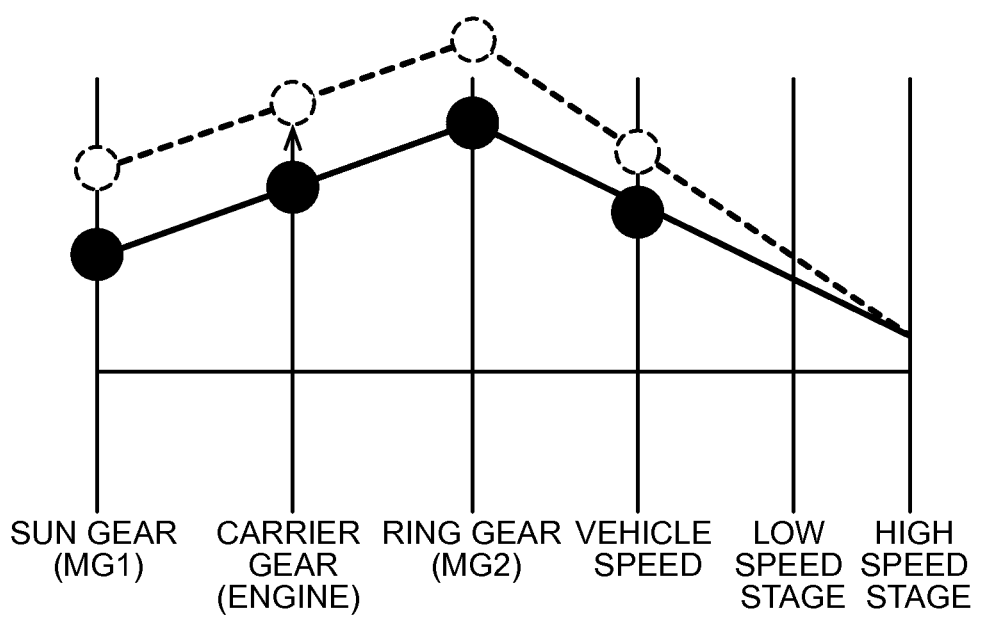
FIG. 6 is a diagram showing a change in the rotation speed of each of an engine and a motor generator in the refrigerant supply operation control of FIG. 5.

As shown in FIG. 6, if the engine speed Ne is increased by the processing of Step S22, the rotation speed of each of the motor generators 14, 36 which are coupled to the engine 12 through the planetary gear mechanism 18 (see FIG. 1) increases, and accordingly, the vehicle speed V increases. When this happens, the driver feels a sense of discomfort, and drivability of the vehicle is deteriorated. Accordingly, in a hybrid vehicle 10B of a third embodiment described below, control for increasing the refrigerant supply pressure is executed while the vehicle speed V is kept constant using the transmission 22.

Next, a hybrid vehicle 10B of a third embodiment will be described referring to FIGS. 7 and 8, in addition to FIG. 1. The hybrid vehicle 10B of this embodiment has the same hardware configuration as the hybrid vehicle 10 of the first embodiment described referring to FIG. 1. Accordingly, a difference will be primarily described, and overlapping description will be omitted here.

Figure 7:
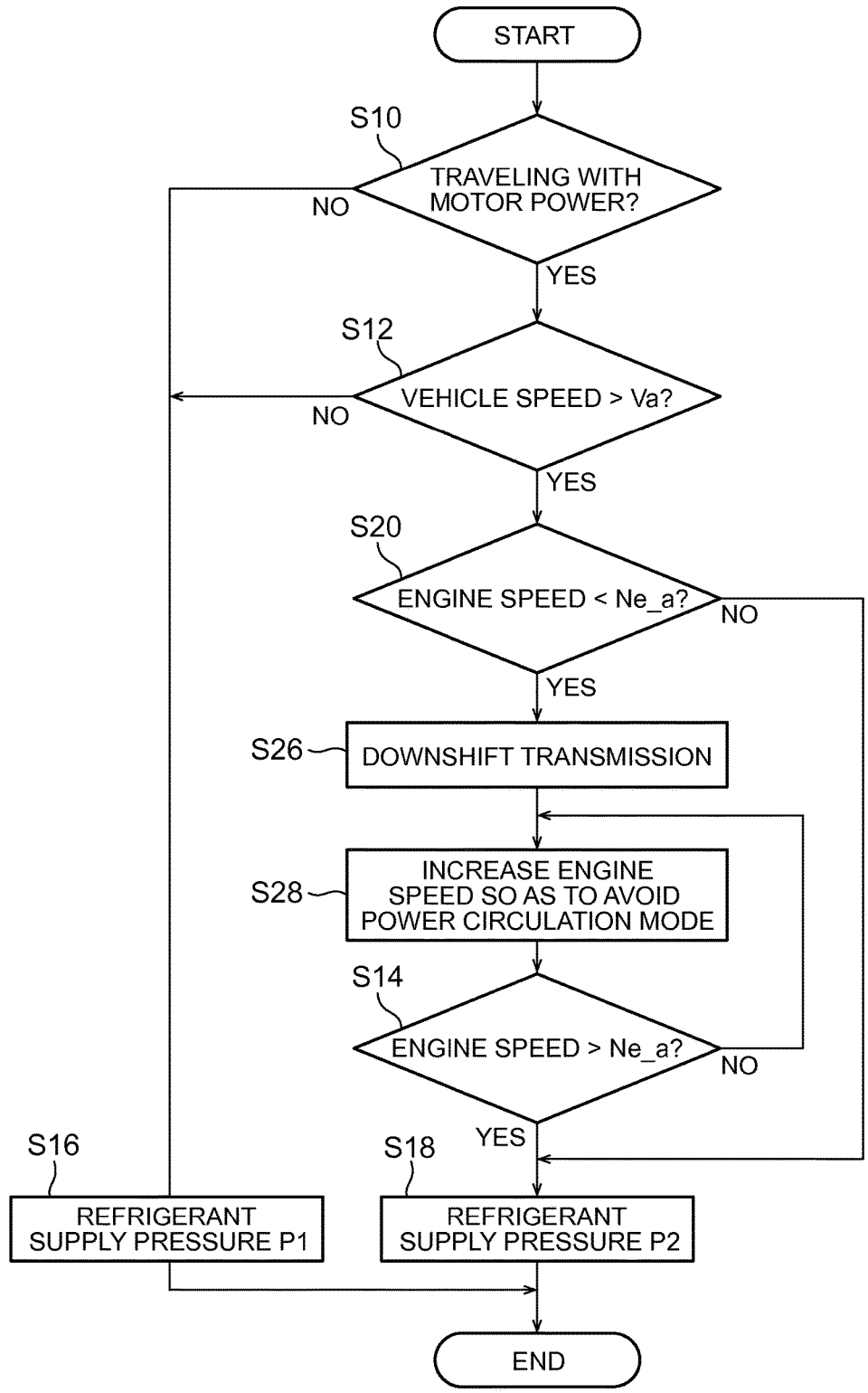
FIG. 7 is a flowchart showing a processing procedure of refrigerant supply operation control which is executed in a control device of the hybrid vehicle of the third embodiment.

FIG. 7 is a flowchart showing a processing procedure of still another refrigerant supply operation control which is executed in the control device 100. In FIG. 7, Steps S10, S12, S14, S16, S18, and S20 are the same as the processing procedure shown in FIG. 5 described above. FIG. 8 is a diagram showing a state of downshifting by the transmission 22 and changes in the rotation speed of the engine 12 and the motor generators 14, 36 in this embodiment.

Referring to FIG. 7, first, in Step S10, the control device 100 determines whether or not the hybrid vehicle 10B travels using power of the motor generator 14, and when it is determined to be affirmative, in the next Step S12, the control device 100 determines whether or not the vehicle speed V is greater than the predetermined value Va. If it is determined to be negative in one of Steps S10 and S12, in the next Step S16, the refrigerant supply pressure is set to P1. On the other hand, if it is determined to be affirmative in Step S12, in the next Step S20, it is determined whether or not the engine speed Ne is smaller than the predetermined value Ne_a. If it is determined to be negative in Step S20, in the next Step S18, processing for setting the refrigerant supply pressure to P2 is executed. The processing described above is the same as in the second embodiment described above.

If it is determined to be affirmative in Step S20 described above (that is, the engine speed Ne<Ne_a), in the next Step S26, the control device 100 transmits a gear shift signal to the transmission 22 to downshift from a high speed stage to a low speed stage. When the transmission 22 is a continuously variable transmission, downshift may be performed from a high speed side to a low speed side.

Figure 8:
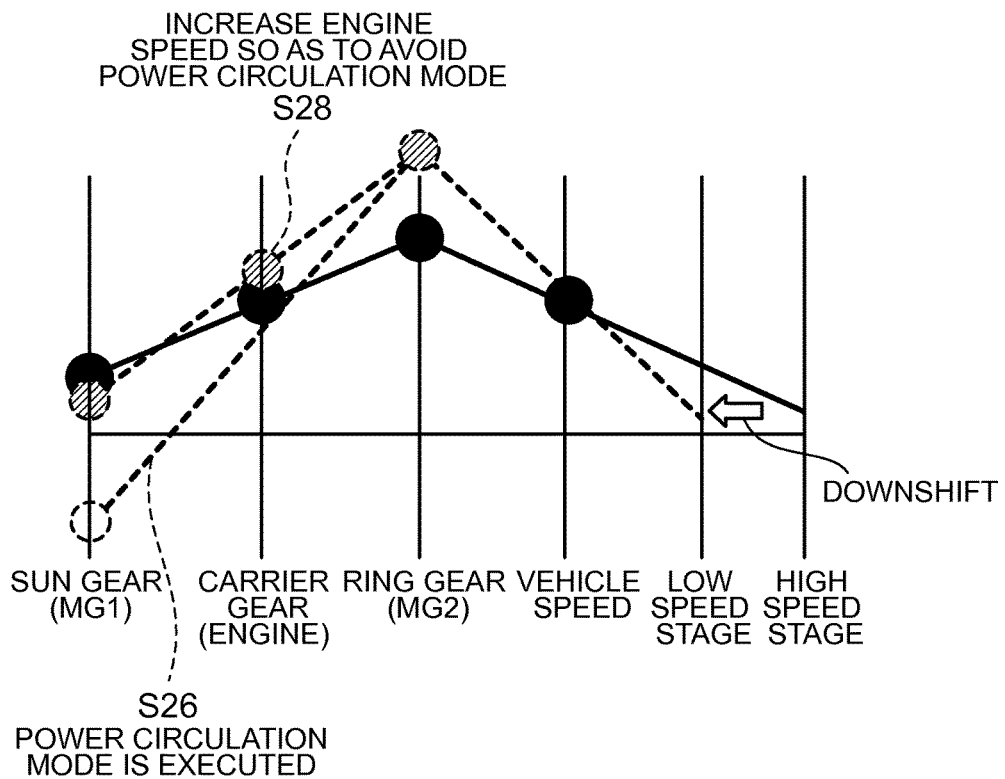
FIG. 8 is a diagram showing a change in the rotation speed of each of an engine and a motor generator in the refrigerant supply operation control of FIG. 7.

Here, referring to FIG. 8, when the vehicle speed V is kept constant in a state of being downshifted by the transmission 22, the motor generator 14 connected to the ring gear of the planetary gear mechanism 18 increases in the rotation speed from a filled circle to a broken-line hatched circle, and generates regenerative electric power with positive rotation. In contrast, the motor generator 36 connected to the sun gear of the planetary gear mechanism 18 changes in the rotation state from a filled circle to a broken-line open circle, and is power-driven in a negative direction as an opposite direction to the motor generator 14. At this time, in the hybrid vehicle 10B, a state, called a "power circulation mode", in which the motor generator 36 is rotationally driven with electric power generated by the motor generator 14, starts.

In the power circulation mode, each of the motor generators 14, 36 does not contribute to vehicle traveling and energy efficiency is degraded. Accordingly, as shown in FIG. 7, in the next Step S28, the control device 100 executes processing for increasing the engine speed Ne so as to avoid entering the power circulation mode.

In the next Step S14, it is determined whether or not the engine speed Ne is greater than the predetermined value Ne_a, and the processing of Step S28 described above is repeatedly executed until it is determined to be affirmative. If the engine speed Ne is greater than the predetermined value Ne_a, in the next Step S18, control for setting the refrigerant supply pressure to P2 is executed. Steps S14 and S18 are the same as in the first and second embodiments.

Here, referring to FIG. 8 again, the engine speed Ne increases from a filled circle to a broken-line hatched circle by the processing of Step S28 described above, whereby the motor generator (MG1) 36 connected to the sun gear changes in the rotation state from a broken-line open circle to a broken-line hatched circle. With this, the rotation direction of the motor generator 36 is a positive direction, and it is possible to avoid or exit the power circulation mode described above.

As described above, according to the hybrid vehicle 10B of this embodiment, control for increasing the engine speed Ne to increase the refrigerant supply pressure without increasing the vehicle speed V can be executed. Accordingly, the driver does not feel a sense of discomfort, and it is possible to appropriately increase the cooling oil amount necessary for cooling the motor after sufficiently securing pump output.

In the third embodiment described above, although control for increasing the engine speed Ne is performed so as to avoid the power circulation mode after the power circulation mode is executed once by downshift of the transmission 22, control for increasing the rotation speed of each of the engine 12 and the motor generator 36 from a filled circle may be performed without performing downshift, thereby executing the control for increasing the refrigerant supply pressure while the vehicle speed is kept constant.

On the other hand, the hybrid vehicle according to the invention is not limited to the respective embodiments described above and modification examples, and various alterations or modifications can be made within the scope of matters recited in the claims of this application and equivalents thereof.

For example, in the above description, although a case where a mechanical pump which is driven with engine output is used as the oil pump 42 has been described, the invention is not limited thereto, and an electric pump which is driven by a dedicated motor may be used alone or in combination. With the use of the electric pump, it is possible to supply cooling oil in a state where the vehicle is stopped, and to continuously cool the motor generator in a state where the vehicle is stopped.

In the above description, although an example where the refrigerant supply pressure is increased from P1 to P2 in the refrigerant supply operation control has been described, the invention is not limited thereto, and for example, the refrigerant supply pressure may be changed in plural stages according to the vehicle speed V. For example, the spool valve element of the pressure regulation valve 44 may be moved to an intermediate position between the first position and the second position, and the upper limit value of the refrigerant supply pressure may be set to P3 (where P1<P3<P2).

What is claimed is:

1. A hybrid vehicle comprising:
an engine;
a motor configured to output power for traveling;
a drive wheel coupled to the engine and the motor;
a transmission provided i) between the engine and the motor and ii) between the engine and the drive wheel, the transmission being configured to shift gears in a plurality of stages or continuously;
a refrigerant supply device including a pump and a refrigerant pressure regulation device, the refrigerant supply device being configured to supply a refrigerant to the motor, and the refrigerant supply device being configured to supply the refrigerant to the transmission as a hydraulic fluid; and
at least one electronic control unit configured to control the refrigerant supply device based on a load situation of the motor by controlling a refrigerant supply pressure to the motor,
wherein the electronic control unit is configured to calculate the load situation of the motor based on at least one of a vehicle speed, a motor temperature, a refrigerant temperature, and a motor output.

2. The hybrid vehicle according to claim 1,
wherein the electronic control unit is configured to increase the refrigerant supply pressure to the motor by the refrigerant pressure regulation device when at least one of conditions i), ii), iii) and iv) is satisfied, i) a vehicle speed is equal to or higher than a predetermined speed, ii) the temperature of the motor is equal to or higher than a predetermined motor temperature, iii) the refrigerant temperature is equal to or higher than a predetermined refrigerant temperature, and iv) the motor output is equal to or greater than a predetermined motor output value.

3. The hybrid vehicle according to claim 1,
wherein the refrigerant supply device includes a refrigerant circulation supply passage which circulates the refrigerant and supplies the refrigerant to the motor, and a refrigerant cooling part provided in the refrigerant circulation supply passage.

4. The hybrid vehicle according to claim 2,
wherein the electronic control unit is configured to
a) control the refrigerant supply device such that the refrigerant supply pressure becomes a first pressure when at least one of conditions i), ii), iii) and iv) is satisfied, i) a vehicle speed is equal to or higher than a predetermined speed, ii) the temperature of the motor is equal to or higher than a predetermined motor temperature, iii) the refrigerant temperature is equal to or higher than a predetermined refrigerant temperature, and iv) the motor output is greater than a predetermined motor output value, and when the output of the pump is less than a predetermined pump output value, and
b) control the refrigerant supply device such that the refrigerant supply pressure becomes a second pressure greater than the first pressure when at least one of conditions i), ii), iii) and iv) is satisfied, i) the vehicle speed is equal to or higher than the predetermined speed, ii) the temperature of the motor is equal to or higher than the predetermined motor temperature, iii) the refrigerant temperature is equal to or higher than the predetermined refrigerant temperature, and iv) the motor output is equal to or greater than the predetermined motor output value, and when the output of the pump is equal to or greater than the predetermined pump output value.

5. The hybrid vehicle according to claim 2,
wherein the pump is a mechanical pump which is driven by at least a part of the output of the engine,
the motor includes a first motor generator and a second motor generator,
the engine, the first motor generator, and the second motor generator are connected such that power is transmitted through a planetary gear mechanism,
the transmission is provided between the planetary gear mechanism and the drive wheel, and
the electronic control unit is configured to change a rotation speed of the engine such that a rotation speed of the drive wheel is kept constant when the refrigerant supply pressure to the motor is changed by the refrigerant pressure regulation device.

6. The hybrid vehicle according to claim 5,
wherein the electronic control unit is configured to, when at least one of conditions i), ii), iii) and iv) is satisfied, i) a vehicle speed is equal to or higher than a predetermined speed, ii) the temperature of the motor is equal to or higher than a predetermined motor temperature, iii) the refrigerant temperature is equal to or higher than a predetermined refrigerant temperature, and iv) the motor output is equal to or greater than a predetermined motor output value, and when the output of the pump is less than the predetermined pump output value,
a) control the engine and the motor in a power circulation mode,
the power circulation mode being a mode in which the transmission performs shift-down, the second motor generator rotates positively to perform regenerative power generation, and the first motor generator is rotationally driven with negative rotation by the generated regenerative power, and b) increase the rotation speed of the engine after the engine and the motor are controlled in the power circulation mode such that the first motor generator rotates positively and the output of the pump becomes equal to or greater than the predetermined pump output value.

7. The hybrid vehicle according to claim 3,
wherein the electronic control unit is configured to
a) control the refrigerant supply device such that the refrigerant supply pressure becomes a first pressure when at least one of conditions i), ii), iii) and iv) is satisfied, i) a vehicle speed is equal to or higher than a predetermined speed, ii) the temperature of the motor is equal to or higher than a predetermined motor temperature, iii) the refrigerant temperature is equal to or higher than a predetermined refrigerant temperature, and iv) the motor output is greater than a predetermined motor output value, and when the output of the pump is less than a predetermined pump output value, and
b) control the refrigerant supply device such that the refrigerant supply pressure becomes a second pressure greater than the first pressure when at least one of conditions i), ii), iii) and iv) is satisfied, i) the vehicle speed is equal to or higher than the predetermined speed, ii) the temperature of the motor is equal to or higher than the predetermined motor temperature, iii) the refrigerant temperature is equal to or higher than the predetermined refrigerant temperature, and iv) the motor output is equal to or greater than the predetermined motor output value, and when the output of the pump is equal to or greater than the predetermined pump output value.

8. The hybrid vehicle according to claim 3,
wherein the pump is a mechanical pump which is driven by at least a part of the output of the engine,
the motor includes a first motor generator and a second motor generator,
the engine, the first motor generator, and the second motor generator are connected such that power is transmitted through a planetary gear mechanism,
the transmission is provided between the planetary gear mechanism and the drive wheel, and
the electronic control unit is configured to change a rotation speed of the engine such that a rotation speed of the drive wheel is kept constant when the refrigerant supply pressure to the motor is changed by the refrigerant pressure regulation device.

9. The hybrid vehicle according to claim 8,
wherein the electronic control unit is configured to, when at least one of conditions i), ii), iii) and iv) is satisfied, i) a vehicle speed is equal to or higher than a predetermined speed, ii) the temperature of the motor is equal to or higher than a predetermined motor temperature, iii) the refrigerant temperature is equal to or higher than a predetermined refrigerant temperature, and iv) the motor output is equal to or greater than a predetermined motor output value, and when the output of the pump is less than the predetermined pump output value,
a) control the engine and the motor in a power circulation mode,
the power circulation mode being a mode in which the transmission performs shift-down, the second motor generator rotates positively to perform regenerative power generation, and the first motor generator is rotationally driven with negative rotation by the generated regenerative power, and b) increase the rotation speed of the engine after the engine and the motor are controlled in the power circulation mode such that the first motor generator rotates positively and the output of the pump becomes equal to or greater than the predetermined pump output value.

\* \* \* \* \*